United States Patent

Kotchey et al.

[11] Patent Number: 5,805,594
[45] Date of Patent: Sep. 8, 1998

[54] ACTIVATION SEQUENCE FOR A NETWORK ROUTER

[75] Inventors: Christopher Michael Kotchey, Apalachin; Robert Edward Hartung, Endicott, both of N.Y.

[73] Assignee: International Business Machines Corporation, Armonk, N.Y.

[21] Appl. No.: 702,342

[22] Filed: Aug. 23, 1996

[51] Int. Cl.$^6$ .................................................. H04L 12/66
[52] U.S. Cl. ............................................ 370/401; 370/255
[58] Field of Search .................................. 370/401, 402, 370/403, 404, 405, 406, 407, 254, 255, 389; 395/200

[56] References Cited

U.S. PATENT DOCUMENTS

| | | | |
|---|---|---|---|
| 5,073,852 | 12/1991 | Siegel et al. | 395/700 |
| 5,086,428 | 2/1992 | Perlman et al. | |
| 5,086,469 | 2/1992 | Yacoby et al. | |
| 5,088,090 | 2/1992 | Yacoby . | |
| 5,095,480 | 3/1992 | Fenner . | |
| 5,144,622 | 9/1992 | Takiyasu et al. | |
| 5,214,646 | 5/1993 | Yacoby . | |
| 5,251,205 | 10/1993 | Callon et al. | |
| 5,282,270 | 1/1994 | Oppenheimer et al. | 395/200 |
| 5,323,388 | 6/1994 | Chang et al. | |
| 5,347,272 | 9/1994 | Ota | 370/401 |
| 5,351,237 | 9/1994 | Shinohara et al. | |
| 5,355,371 | 10/1994 | Auerbach et al. | |
| 5,361,256 | 11/1994 | Doeringer et al. | |
| 5,377,327 | 12/1994 | Jain et al. | 395/200 |

(List continued on next page.)

FOREIGN PATENT DOCUMENTS

| | | |
|---|---|---|
| 551243 | 7/1993 | European Pat. Off. . |
| 588510 | 3/1994 | European Pat. Off. . |
| 04-183044 | 6/1992 | Japan . |

OTHER PUBLICATIONS

IBM Technical Disclosure Bulletin, vol. 24, No. 9, Feb. '82, "Transmission Group Termination In System Network Architecture", pp. 4524–4526.

IBM Technical Disclosure Bulletin, vol. 38, No. 02, Feb. 1995, "Immediate Address Retention for Internetwork Packet Exchange Transmission", pp. 585–586.

IBM Technical Disclosure Bulletin, vol. 37, No. 03, Mar. 1994, "Ethernet Bandwidth Management", pp. 591–594.

Inside Apple Talk, Second Edition by Gursharan S. Sidhu, Richard F. Andrews, Alan B. Oppenheimer, Apple Computer, Inc., pp. 5–17 —5–19.

IBM Technical Disclosure Bulletin, vol. 36, No. 09A. Sep. 1993, "Multiple Entry Joint Recursive Branch Predictor", pp. 521–524.

IBM Technical Disclosure Bulletin, vol. 36, No. 08, Aug. 1993, "Source Routing for Netbios in AIX", pp. 59–60.

IBM Technical Disclosure Bulletin, vol. 30, No. 11, Apr. 1988, "Embedded General Macro Capability for Printers", pp. 226–228.

IBM Technical Disclosure Bulletin, vol. 38, No. 02, Feb. 1995, "Systems Network Architecture Distribution Services Agent In–Progress Queue Methods and Recovery", pp. 465–472.

(List continued on next page.)

*Primary Examiner*—Ajit Patel
*Attorney, Agent, or Firm*—Shelley M. Beckstrand

[57] ABSTRACT

Method and apparatus for enabling an IPX router to enter a network. The router does so by (a) transmitting on the network an RIP general request with null source and destination network designations; (b) receiving replies from other routers and determining therefrom the correct source and destination network designations; and thereafter (c) activating an interface to the network including transmitting a RIP response broadcast with the correct source and destination network designations; and (d) in the event that a reply is not received to the RIP general request within a predetermined time, otherwise activating the interface to the network.

9 Claims, 5 Drawing Sheets

U.S. PATENT DOCUMENTS

| | | |
|---|---|---|
| 5,379,296 | 1/1995 | Johnson et al. . |
| 5,388,213 | 2/1995 | Oppenheimer et al. ............. 395/200 |
| 5,398,242 | 3/1995 | Perlman ............................... 370/401 |
| 5,420,862 | 5/1995 | Perlman ............................... 370/401 |
| 5,500,860 | 3/1996 | Perlman ............................... 370/401 |
| 5,612,957 | 3/1997 | Gregerson et al. ................... 370/401 |

OTHER PUBLICATIONS

IBM Technical Disclousre Bulletin, vol. 38, No. 12, Dec. 1993, "Packet Resequencing Algorithm with Priority Support", pp. 77–88.

IBM Technical Disclosure Bulletin, vol. 15, No. 2, Jul. 1972, "Communications Protocol For Computer Network", pp. 593–595.

ACTIVATION SEQUENCE FOR A NETWORK ROUTER

BACKGROUND OF THE INVENTION

1. Technical Field of the Invention

This invention relates to communications protocols, and more particularly a system and method for activating IPX routers on a network.

2. Background Art

The Internet Packet exchange (IPX) protocol is used primarily by Novell in its NetWare network software products. It is responsible for the delivery of data packets (datagrams) from one computer system to another through a computer network. IPX uses Routing Information Protocol (RIP) to determine the reachability of different networks. In a given network router A, RIP is used to send routing information to other routers, so that another router B knows that it can reach not only the networks to which it is directly connected, but also those networks that it learned it can reach through router A. This process continues until all routers eventually know how to reach all networks that are connected together through routers. RIP shares this routing information between network routers by periodically broadcasting the contents of its routing table every 60 seconds to all routers that are connected to the same networks as the originating router. In addition, RIP allows for a particular system to directly request that another router send routing information to it. These requests can be in the form of a specific request, in which specific network numbers are requested, or a general request, which results in a reply containing all routing information.

Systems using the IPX protocol are assigned an address that is in two parts. The network number indicates the network to which the system is attached, and the node number indicates which system on the given network it is.

Data packets are created with two addresses. The source address indicates which network and node is sending the data packet, and the destination address indicates to which network and node on that network the data packet is to be delivered.

IPX reserves a special network number of zero. A data packet that is addressed to a node on network zero is interpreted to have a destination network of whatever the current network number is. That is, network number zero means "this network". Thus, a packet with a network number of zero is never routed from one network to another.

Problems can arise if two routers are connected to the same network, but one of the routers is configured with a different network number than the other. In such a situation, each router does not receive data packets from the other because each router fails to recognize that they are on the same network.

A typical Internet Packet Exchange (IPX) router, when activated, periodically broadcasts its own routing information protocol (RIP) information. Typically, though configurable, that period is every 60 seconds. This broadcast occurs without regard to the actual network number of the attached network. If a router is configured with the wrong network number, it may take up to 60 seconds for another router to perform its broadcasts before the new router recognizes that the two routers are using different network numbers for the same network. In addition, in this example, it may take up to 60 seconds before the new router learns of all the network reachability information, including routes and services, from the other routers.

In another communications protocol, the Datagram Delivery Protocol (DDP), including the Routing Table Maintenance Protocol (RTMP), a request node sends out a specific request message to other nodes. This request message has a null value (meaning "unknown") in the node ID field. The RTMP response includes a source node ID value. The original requesting node must then send a request message to the responding node for the information required to update its routing tables. See, S. Sidhu, et al. *Inside AppleTalk*, Second Edition, Addison-Wesley Publishing Co., 1990, pages 5–17 to 5–19.

It is, therefore, an object of the invention to facilitate the entry of an IPX router to a network.

It is another object of the invention to assure that IPX routers will receive and process RIP requests from a new router entering the network.

It is another object of the invention to provide a system and method for facilitating the entry of a requesting router to a network with a single exchange of request/response messages with respect to a responding router, with the response message containing all routing information required by the requesting router from the responding router.

It is a further object of the invention to provide an apparatus and method whereby an IPX router can, upon activation, immediately verify the correctness of the network number of the networks to which it is attached while ensuring routing tables of other routers do not become corrupted with inaccurate data in the event that the router was activated with the wrong network number(s).

SUMMARY OF THE INVENTION

This invention provides a method and apparatus for enabling an IPX router to enter a network. The router does so by (a) transmitting on the network an RIP general request with null source and destination network designations; (b) receiving replies from other routers and determining therefrom the correct source and destination network designations; and thereafter (c) transmitting a RIP response broadcast with the correct source and destination network designations.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
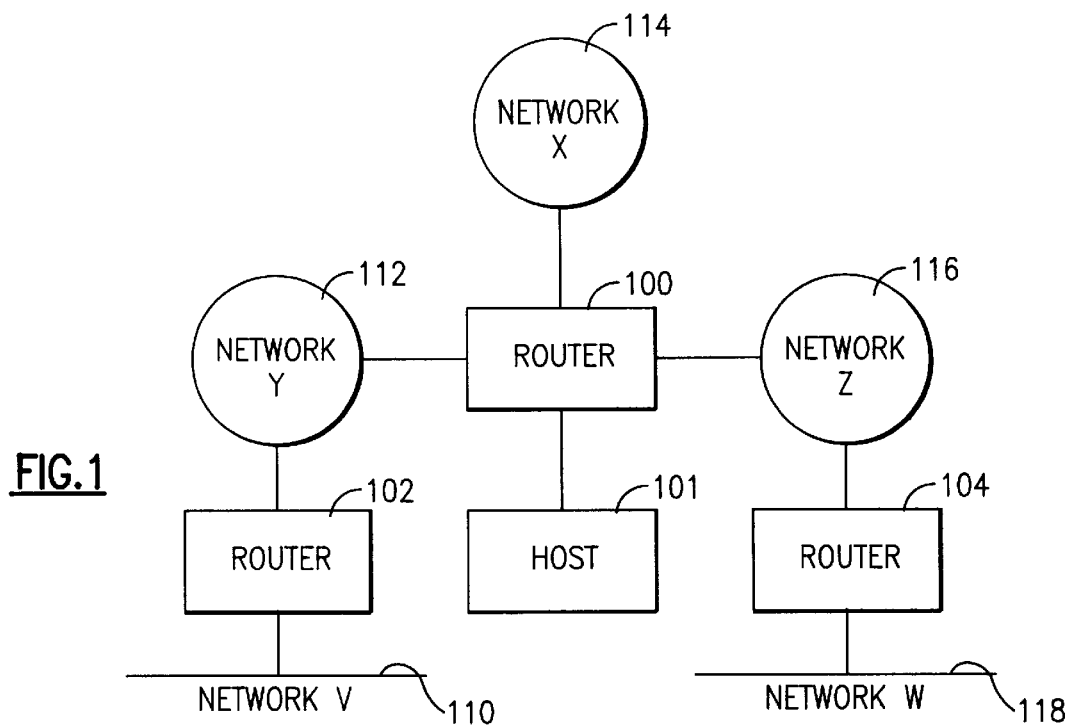
FIG. 1 is a system diagram illustrating a plurality of distinct computer networks interconnected by network routers.

Referring to FIG. 1, network routers 100, 102 and 104 are computers that connected to two or more distinct computer networks 110, 112, 114, 116, and 118 for the purpose of transferring data packets from one network to another. In a preferred embodiment of the invention, network routers 100, 102 and 104 are IPX routers, which support the IPX protocol. In a specific implementation of such a router, in accordance with the International Organization for Standardization (ISO) networking model including seven layers of functionality, router 100 has to do with three layers: the physical layer, the data link layer, and the network layer (from bottom to top). The other layers, going up the stack, are the transport layer, the session layer, the presentation layer, and the application layer. (See McDaniel, George. *IBM Dictionary of Computing,* McGraw Hill, 1994, page 478.) Each layer conceptually provides function that is used by the next higher layer. The physical layer is the hardware: the specifics of how (electrically, and such) data is transmitted over a certain network medium. The data link layer is concerned with using the physical layer to move data from one machine to another on a single network. The network layer uses the data link layer to move data from one machine to another over different networks. IPX router 100 is at the network layer, and functions to route data from one machine to another anywhere in a network.

Figure 2:
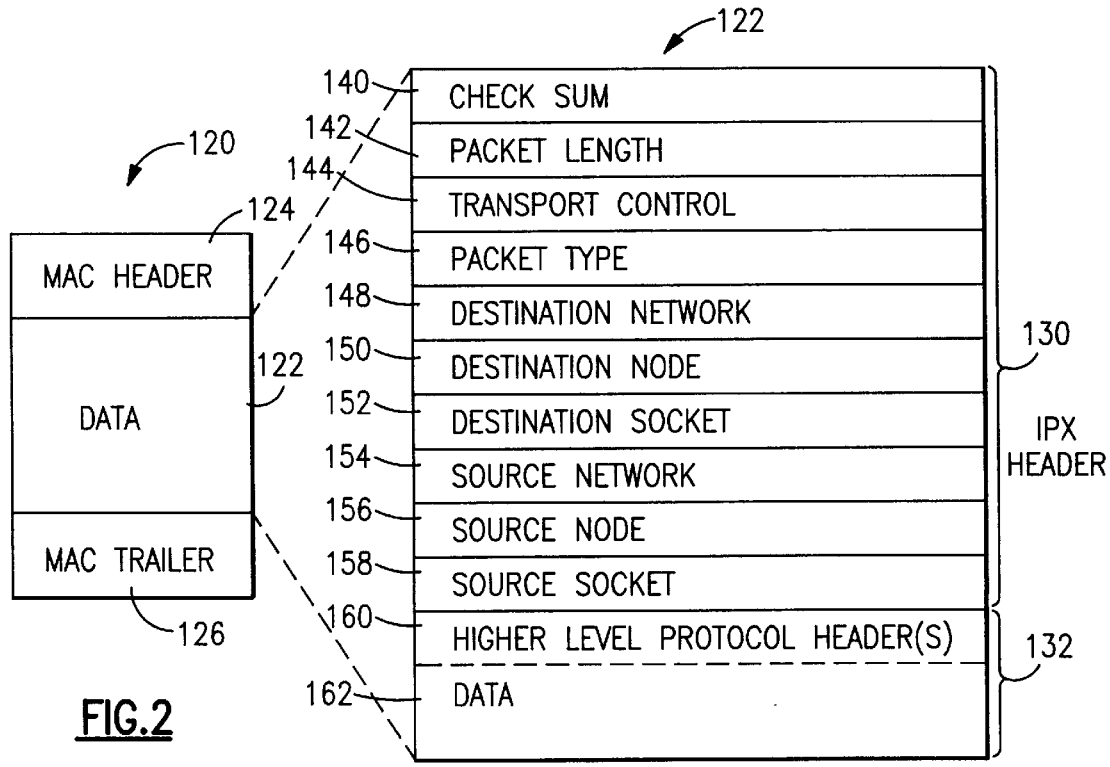
FIG. 2 illustrates the Internet Packet exchange (IPX) packet structure.

Referring to FIG. 2, IPX data packet 120 is the basic transmission unit used by all protocols in the IPX protocol suite. All information transmitted over, for example, a NetWare network will be encapsulated in an IPX packet 122 before being wrapped with the appropriate link layer headers and trailers, in this preferred embodiment media access control (MAC) header 124 and MAC trailer 126, and sent over the network.

In the Open System Interconnection (OSI) networking model, the data link layer can be split into two functions: media access control (MAC) and logical link control (LLC). MAC deals with how to get the data into the correct physical form (e.g., electrical voltages) to access the physical layer. LLC handles the addressing of a data packet to get from one piece of hardware to another on the same network. In this specific embodiment, these two layers, MAC and LLC, add the MAC header 124 and MAC trailer 126, and put the resulting frame on the physical network. (At this level, the data packet, or datagram, is referred to as a frame.) As such, the LLC is a component of the router; and responds to a request from the network layer (in this specific embodiment, IPX) to send a packet from this system to a remote system by establishing a path to that remote system and returning control to the network layer where processing of the actual packet contents takes place.

For this preferred embodiment, the IPX packet structure 122 is defined by Novell in its *IPX Router Specification* to include a data area 132 and an IPX header 130 including checksum 140, packet length 142, transport control 144, packet type 146, destination network 148, destination node 150, destination socket 152, source network 154, source node 156, source socket 158. Data area 132 may include higher level protocol headers 160.

Checksum 140 is a 2 byte field available for performing checksum error detection. Packet length 142 is a two byte field giving the length, in bytes, of IPX packet 122, including IPX header 130. Transport control 144 is a one byte field giving the number of routers the packet has passed through (i.e., hops) on its way to its destination. This field 144 is used to limit the number of times a packet is forwarded to other routers. Packet type 146 is a one byte field identifying the type of packet. Packet types 146 of interest to this invention are unknown (0x00), and RIP (0x01). Destination network 148 is a 4 byte field containing the target network number. Destination node 150 is a six byte field giving the target node number, which in an IPX protocol stack is the same as a machine's MAC hardware address. Destination socket 152 is a two byte field containing the target socket number. Source network 154 is a 4 byte field containing the originating network number. Source node 156 is a six byte field giving the originating node number, which in an IPX protocol stack is the same as a machine's MAC hardware address. Source socket 158 is a two byte field containing the originating socket number. A socket number of interest to this invention is RIP (0x0453).

Figure 3:
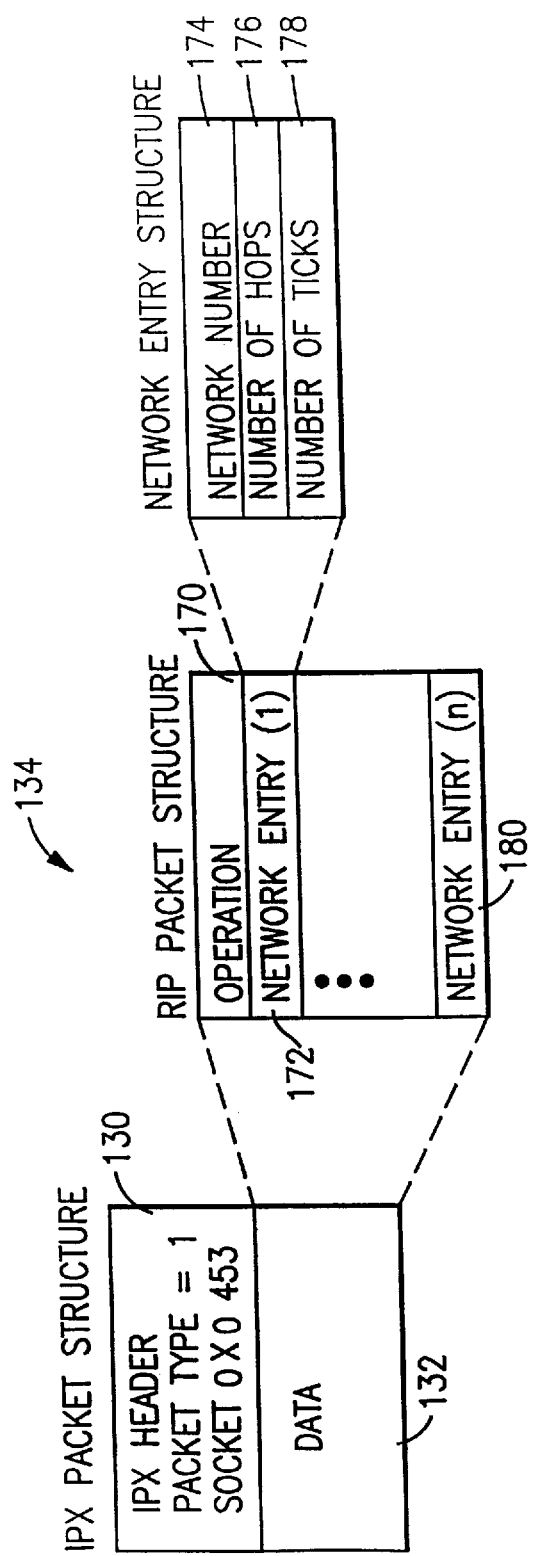
FIG. 3 illustrates Routing Information Protocol (RIP) packet structure.

Referring to FIG. 3, RIP packet structure 134 is described. Data area 132 is a RIP packet structure when IPX header 130 includes packet type field 146 equal to 0x01 and socket field 152 equal to 0x0453. RIP packet structure 134 includes two byte operation field 170 indicating whether packet 122 is a request (0x01) or a response (0x02) packet; and one to n eight byte network entry fields 172, 180—each network entry field 172, 180 including network number 174, a four byte field giving the network number that is the subject of the RIP request or response, number of hops 176, a two byte field giving the number of routers that must be passed through to reach the specified network, and number of ticks 178, a two byte field giving the amount of time, in ticks, that the packet takes to reach the specified network. (There are 18.21 ticks per second.)

During the initialization process of an IPX router, it is important that it should determine if there are any network number configuration problems. By detecting configuration problems before important information is shared between routers, such as network routing information, the spread of erroneous data to other routers can be avoided.

During activation of an IPX router, the first data packet that is broadcast over an attached network is a Routing Information Protocol (RIP) general request packet. In accordance with this invention, this RIP general request packet, however, is broadcast to other attached routers by assigning the packet both a source and destination network number of zero. This accomplishes two things:

1. By using network number zero, it is ensured that other routers will receive and process the RIP request. Otherwise, if the router was activated with an incorrect network number, the other routers would have ignored the packets because they are not addressed to the same network number as the receiving router.

2. By sending a general RIP request, a series of RIP packets will be sent from the receiving routers back to the router that is being activated.

When the RIP packets are received from the other routers, the source network number of these packets can be compared to the network number the new router is configured to use on the connected network. If the source network number of these data packets is different than the configured value, the error condition can be detected and handled as necessary, and before any erroneous routing information is shared with the other network routers. In addition, the RIP packets sent by the other routers are received immediately after the RIP general request was sent, and the new router need not wait for up to 60 seconds for the other routers to send their routing information during their normal periodic broadcasting.

An activating IPX network router executes the following procedure for each network to which it is connected:

Determine the configured network number X.

Broadcast a RIP general request to all systems on the attached network with source and destination network number set to zero.

Delay for brief period of time while RIP responses are received.

If (no response is received)

Assume it is the only router on network, and its configured network number is OK.

Else

If (source network number of any received RIP response does not match the configured network number X)

Indicate a configuration error has occurred and stop processing

Else

The configured network number X is OK

If configured network number is OK, begin periodic broadcasting of routing information in RIP packets according to the protocol.

Each service access point (SAP) must have its own unique IPX network number. Devices out on the network generally can communicate using only one SAP at a time; most often, a user must select which SAP will be used, and the device is then restarted or rebooted to use that SAP. Any frames that arrive at the device on a different SAP will be ignored. It follows that three or more devices, each running a different SAP, could be sending and receiving data on the same network to other devices that are running matching SAPs. These devices would not access each others' data traffic, nor would they even realize there were other SAPs in use at the same time.

Since different service access points (SAPS) on a single network segment operate independently, each SAP is on a network segment of its own. In accordance with the IPX specification, each network segment is assigned a unique IPX network number. For devices that can support multiple SAPs simultaneously (such as the AS/400 Ethernet and token-ring IOPs), this means there will be an IPX network number for each open SAP, and frames directed to a particular destination network must be formatted according to the SAP associated with that network.

Figure 4:
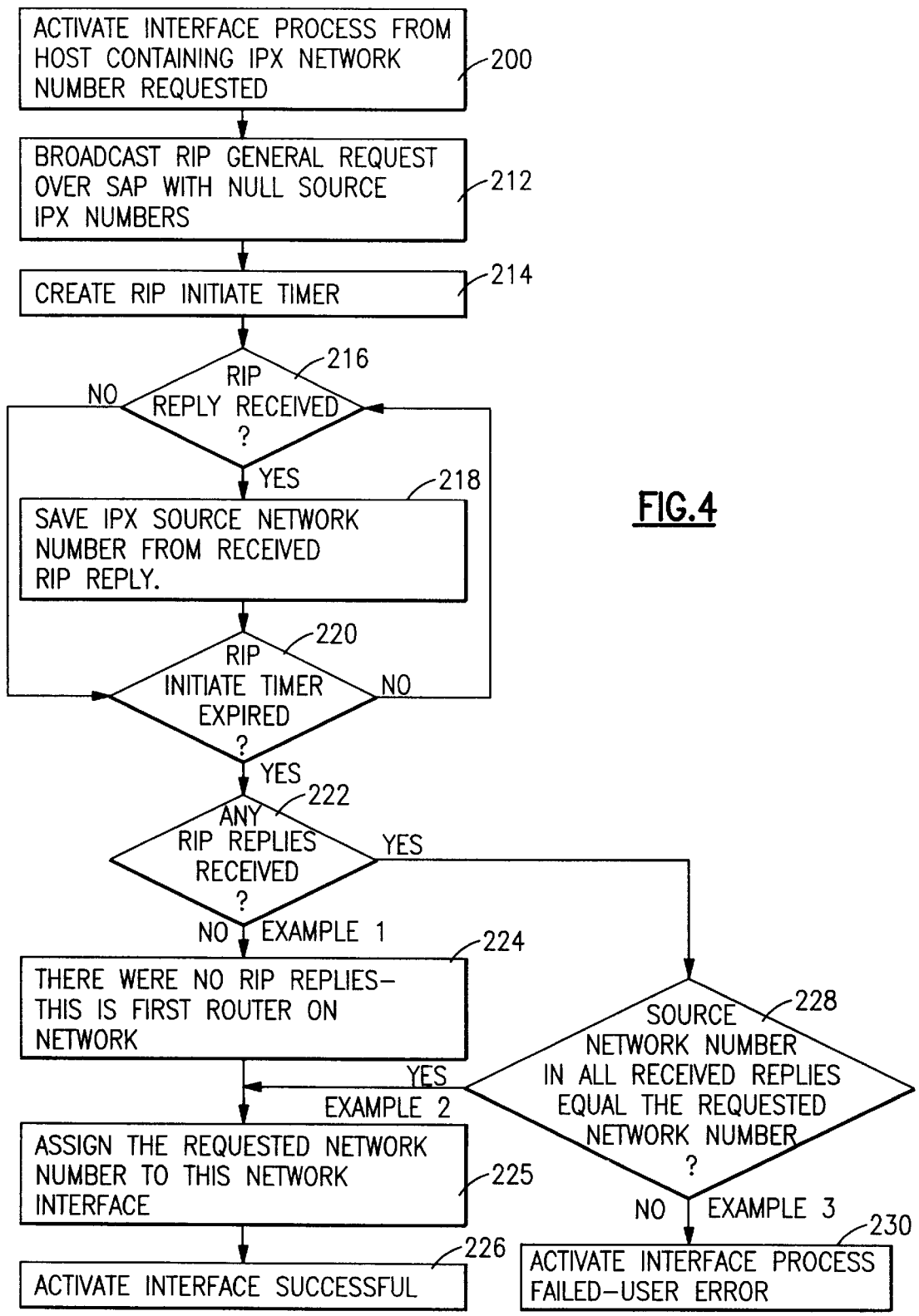
FIG. 4 is a process flow chart showing the method of the invention.

Referring to FIG. 4, the process of the invention for activating an interface to a network is set forth.

In step 200, this router 100 receives an activate interface (AI) process request from host 101 containing in a data out descriptor (DOD) (to use an AS/400 term) block a user supplied IPX network number and a service access point (SAP: that is, in Novell terminology, the frame type) to be activated. In this specific embodiment, the service access point (SAP) refers to the interface between the logical link control (LLC) layer and the media access contorl (MAC) layer, with one SAP provided for each IPX network number. This network number and SAP represent tentative values which are to be checked for correctness in the process steps which follow. Thus, processing continues to step 212 to verify that the tentative IPX network number supplied in the activate interface DOD (step 200) is the correct IPX network 112 number, and that the tentative SAP supplied in the DOD is the correct one. This is done by determining whether the current network number assigned by other routers using the SAP (that is, frame type) is the same as that provided in the activate interface DOD 200. In step 212, router 100 broadcasts a RIP general request (operation field 170=0x01) over the service access point (SAP) with the IPX header 130 containing null source IPX numbers, done in this embodiment by entering zero in source IPX network number field 154. Any devices that reply will not only provide a RIP response message 134 (operation field 170=0x02), but will also update the source IPX network number 148 from the zeros supplied (in field 154 of the RIP general request, step 212) to the actual network number in use.

In step 214, upon issuing the RIP general request of step 212, router 100 creates a RIP initiate timer to allow devices that receive the request some time (say, 2 seconds) to reply. It is expected that this timer will expire; it is not an error condition in this case, but an indication that sufficient time has elapsed to receive any replies that may be expected.

In step 216, processing awaits the RIP reply. As each RIP reply is received, in step 218 the IPX source network number 154 is saved for this service access point (SAP). This is repeated for each response received before the RIP initiate timer expires.

When, in step 220, it is determined that the RIP initiate timer has expired, then in step 222 it is determined whether or not any RIP replies have been received. If not, this router 100 is the first one activated on the network. Consequently, this router 100 can define the network number that will be used by other devices as well, and does so by saving the IPX network number in the DOD (step 200) entry for this service access point (SAP). The activate interface process has been successful, and in step 226 an appropriate completion status is returned to the host.

If, in step 222, it is determined that one or more RIP replies were received, in step 228 these replies are compared with the requested network number supplied in the DOD (step 200). If exactly equal (example 2), then in step 226 an activate interface process successful indication is returned to the host. If not exactly equal (example 3), the activate interface process has failed due to an user configuration error in defining the IPX network number.

An activate interface successful (step 226) completion status indicates that the IPX code is fully operational, and is ready to send and receive data over the activated service access point (SAP). And, it is an advantage and aspect of this embodiment of the invention that this router 100 is enabled to send and receive data over the activated service access point (SAP) with a single exchange of RIP request/reply packets with other routers on the network.

The operation of the invention is illustrated in connection with the following three examples.

EXAMPLE 1

Figure 5:
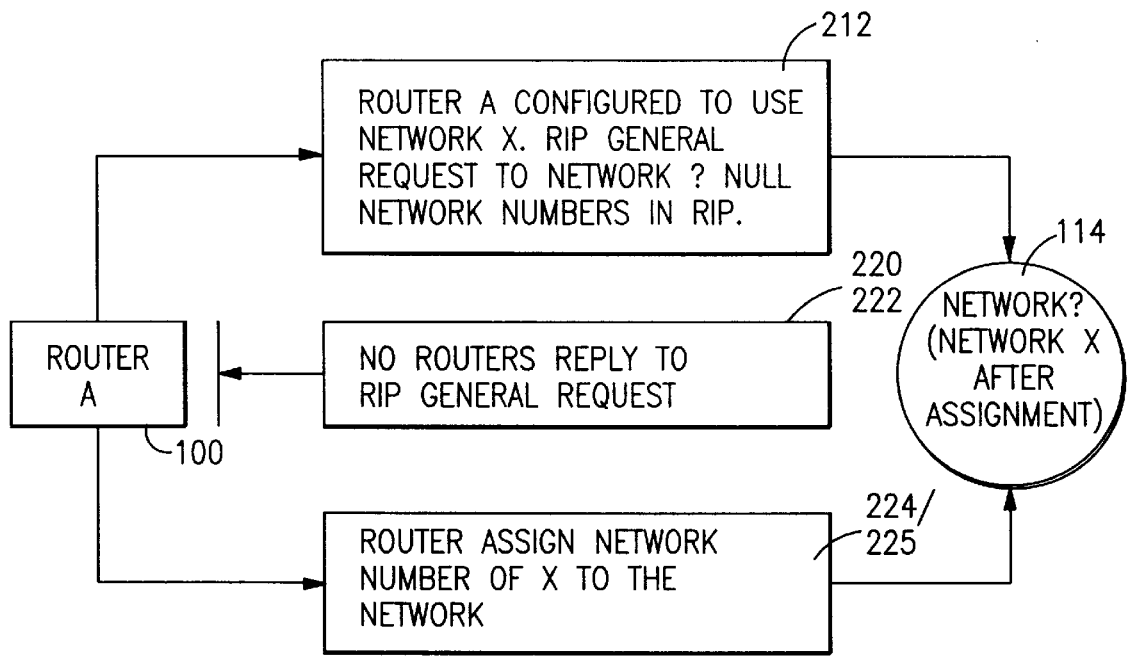
FIG. 5 is a flow diagram illustrating the manner in which a router accesses a network when it is the only router on the network (example 1).

Referring to FIG. 5, router A is activated on a network with no other routers present, as follows: router A broadcasts a RIP general request with source and destination network numbers set to zero. After a brief delay, the router does not receive any replies to the RIP request, and assumes that it is the only router on the network. Activation completes successfully.

EXAMPLE 2

Figure 6:
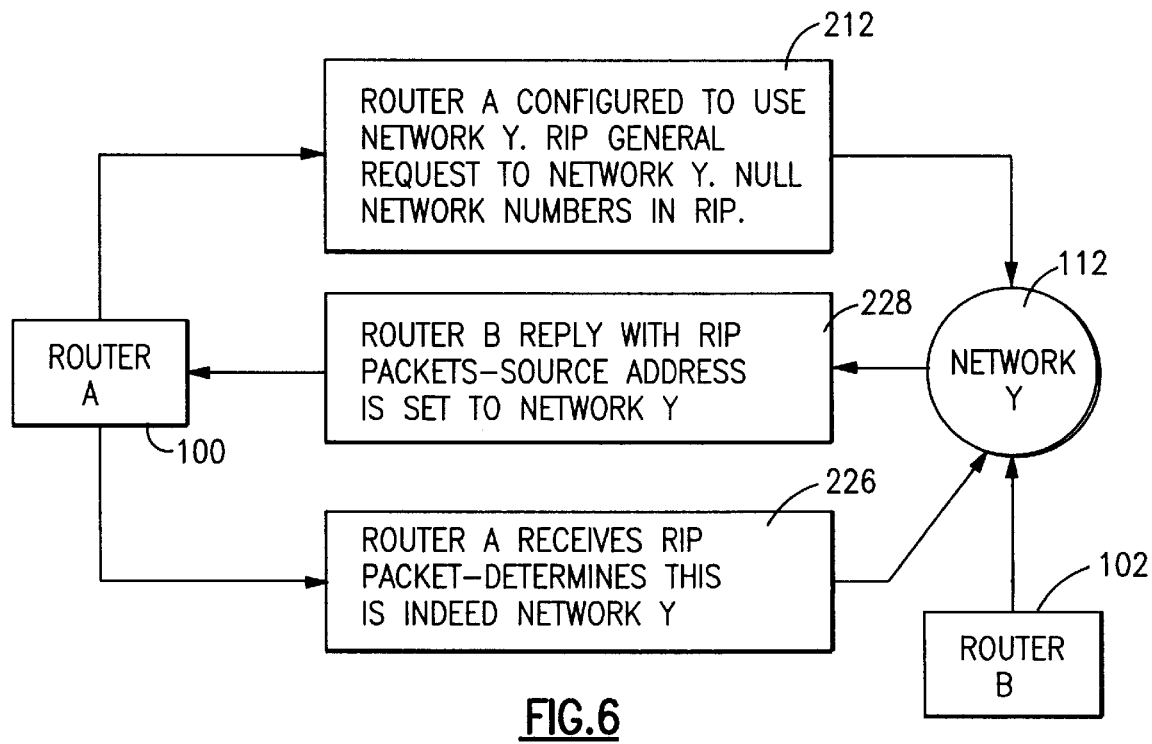
FIG. 6 is a flow diagram illustrating the manner in which a router accesses a network when the configured network number is correct (example 2).

Referring to FIG. 6, router A is activated on a network with at least one other router attached to the same network. Router A is configured to assign a network number of Y to the attached network. Router A broadcasts a RIP general request with null source and destination network numbers (set to zero.) All of the other routers reply to the request with RIP data packets. The source and destination network fields of these data packets contain the actual network number in use, which is network number Y, together with the routing information required by router A to update its routing information database. After a brief delay, router A verifies that the source network number of all received RIP packets matches the configured network number Y. Activation completes successfully.

EXAMPLE 3

Figure 7:
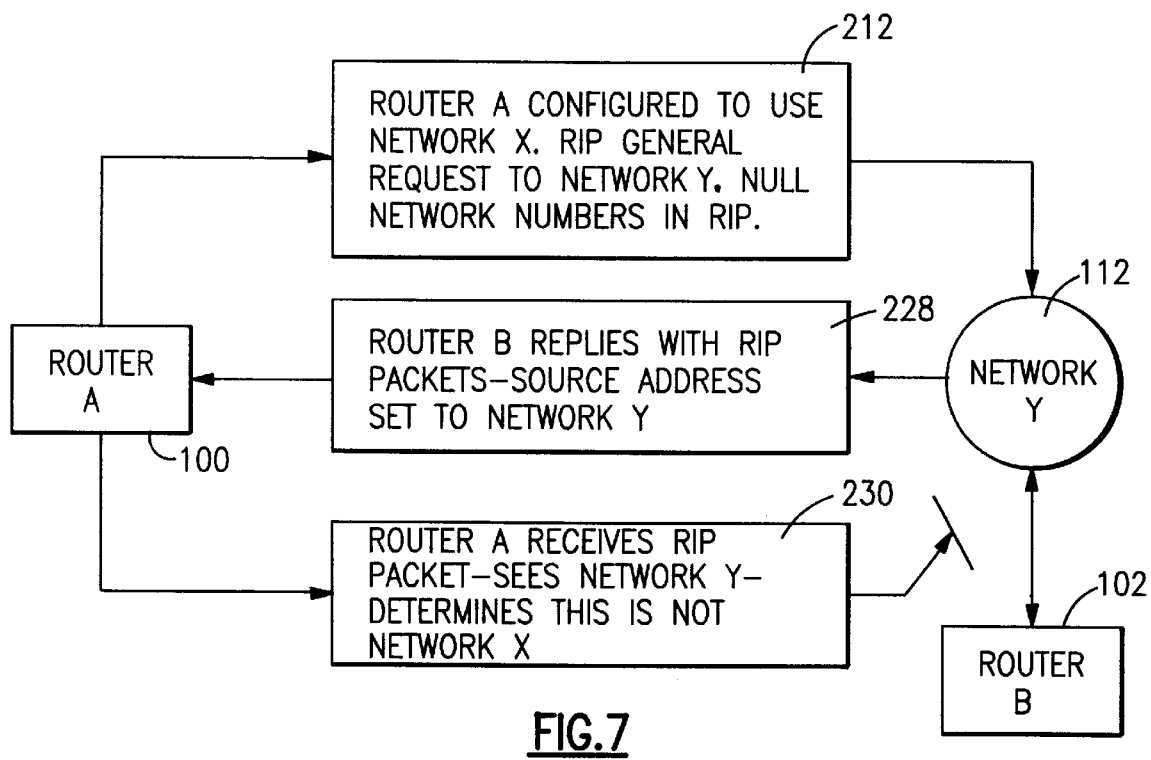
FIG. 7 is a flow diagram illustrating the manner in which a router accesses a network when the configured network number is not correct (example 3).

Referring to FIG. 7, router A is activated on a network with at least one other router attached to the same network. Router A is configured to assign a network number of X to the attached network. Router A broadcasts a RIP general request with null source and destination network numbers (e.g., set to zero.) All of the other routers reply to the request with RIP data packets. The source and destination network fields of these data packets contain the actual network number in use, which is network number Y. After a brief delay, router A determines that the source network number of the received RIP packets does not match its own configured network number X. Consequently, activation fails. The network number Y is returned to the end user of router A so that a configuration correction can be made.

ADVANTAGES OVER THE PRIOR ART

In accordance with this invention, an apparatus and method are provided whereby an IPX router, or the like, can, upon activation, immediately verify the correctness of the network number of the networks to which it is attached while ensuring routing tables of other routers do not become corrupted with inaccurate data in the event that the router was activated with the wrong network number(s).

This network interface activation method of the invention also has an advantage in that if the configured network number has been determined to be valid, the routing information from all other attached routers has already been received and incorporated into the new routers routing table. It is not necessary to wait up to 60 seconds for the periodic broadcasting of routing information from the other routers.

Further, the system and method of the invention facilitates the entry of a requesting router to a network with a single exchange of request/response messages with respect to a responding router, the response message containing all information required by the requesting router from the responding router to update its routing table.

ALTERNATIVE EMBODIMENTS

It will be appreciated that, although specific embodiments of the invention have been described herein for purposes of illustration, various modifications may be made without departing from the spirit and scope of the invention. In particular, while the preferred embodiment has been described primarily in the context of its use in an IPX router, as will be apparent to those skilled in the art, it may be used in the context of any protocol where target or destination networks respond to null, or the like, source and target designations with a correct designation. The null designation is interpreted to mean this network number, whatever the actual network number is. Thus, the invention is applicable to a network protocol which reserves some special network number TN such that a data packet that is addressed to a node on network TN is interpreted to have the network number of whatever the current network number is. Network number TN means "this network". In this case, a router receiving a packet with network number TN will respond with packets containing its correct network number, and the process of the invention is enabled for a new router to activate an interface to the network. The null designation can be used in both source and network addresses.

Clearly, any computing system capable of interfacing to a network may be configured to operate as a router operable in accordance with this invention, including but not limited to those which are configured according to the ISO networking model. Such systems include, for example, the IBM AS/400 system, and also the IBM System/390 computing system, and the IBM Personal Computer.

Accordingly, the scope of protection of this invention is limited only by the following claims and their equivalents.

We claim:

1. A method for operating a digital computing device to enable a router to enter a network, the router including a routing table, comprising the steps of:
   transmitting to said network a first general request broadcast with zero source and zero destination network numbers;
   receiving replies from other routers on said network and determining therefrom the correct source and destination network numbers and information required for updating said routing table; and thereafter
   transmitting further general request and response broadcasts on said network, each with correct source and destination network numbers.

2. The method of claim 1 wherein said router is an Internet Packet exchange (IPX) router, wherein said first general request is a Routing Information Protocol (RIP) request, and wherein said response broadcasts include an RIP response.

3. A method for operating a digital computing device to enable an Internet Packet exchange (IPX) router to enter a network, comprising the steps of:
   transmitting to said network a Routing Information Protocol (RIP) general request with zero source and zero destination network numbers;
   receiving replies from routers on said network and determining therefrom the correct source and destination network numbers; and thereafter
   transmitting an RIP response broadcast to said network with correct source and destination network numbers.

4. A method for operating a digital computing device to enable a router to enter a network, comprising the steps of:
   receiving a request from a host to activate a router interface to a network, said request including a first network number;
   transmitting to said network a first general request with a zero network number;
   receiving a reply from another router on said network, said reply including a second network number;
   responsive to said first and second network numbers comparing equal, activating said router interface; and
   responsive to said first and second network numbers not comparing equal, terminating router interface activation.

5. A method for operating a digital computing device to enable a router to enter a network, comprising the steps of:
   receiving a request from a host to activate a router interface to a network, said request including a first network number;
   transmitting to said network a first general request with a zero network number;
   waiting for a predetermined time for a reply from another router on said network;
   responsive to expiration of said predetermined time without receiving said reply, activating said router interface.

6. The method of claim 5 wherein said router interface is activated with said first network number.

7. A method for operating a digital computing device to enable router to enter a network, comprising the steps of:
   receiving a request from a host to activate a router interface to a network, said request including a first network number;

transmitting to said network a first general request with a zero network number;

waiting for a predetermined time for a reply from any other router on said network;

responsive to expiration of said predetermined time without receiving said reply, activating said router interface; and responsive to receiving a reply from any other router on said network prior to expiration of said predetermined time, said reply including a second network number, if said first and second network numbers compare equal, activating said router interface; otherwise, terminating router interface activation.

8. A computer readable memory device used to enable a router to enter a network according to the steps of:

transmitting to said network a first general request with zero source and zero destination network numbers;

receiving replies from other routers on said network and determining therefrom the correct source and destination network numbers; and thereafter transmitting further general request and response broadcasts on said network, each with correct source and destination network numbers.

9. A network router for activating router interface to a communications network, comprising:

means for transmitting to said network a first general request with zero source and zero destination network numbers;

means for receiving replies from other routers on said network and determining therefrom the correct source and destination network numbers; and means for activating said router interface by transmitting further general request and response broadcasts, each with correct source and destination network numbers.

* * * * *